Dec. 2, 1941.  E. LATSHAW  2,264,701
TRUCK
Filed Dec. 8, 1938  2 Sheets-Sheet 1
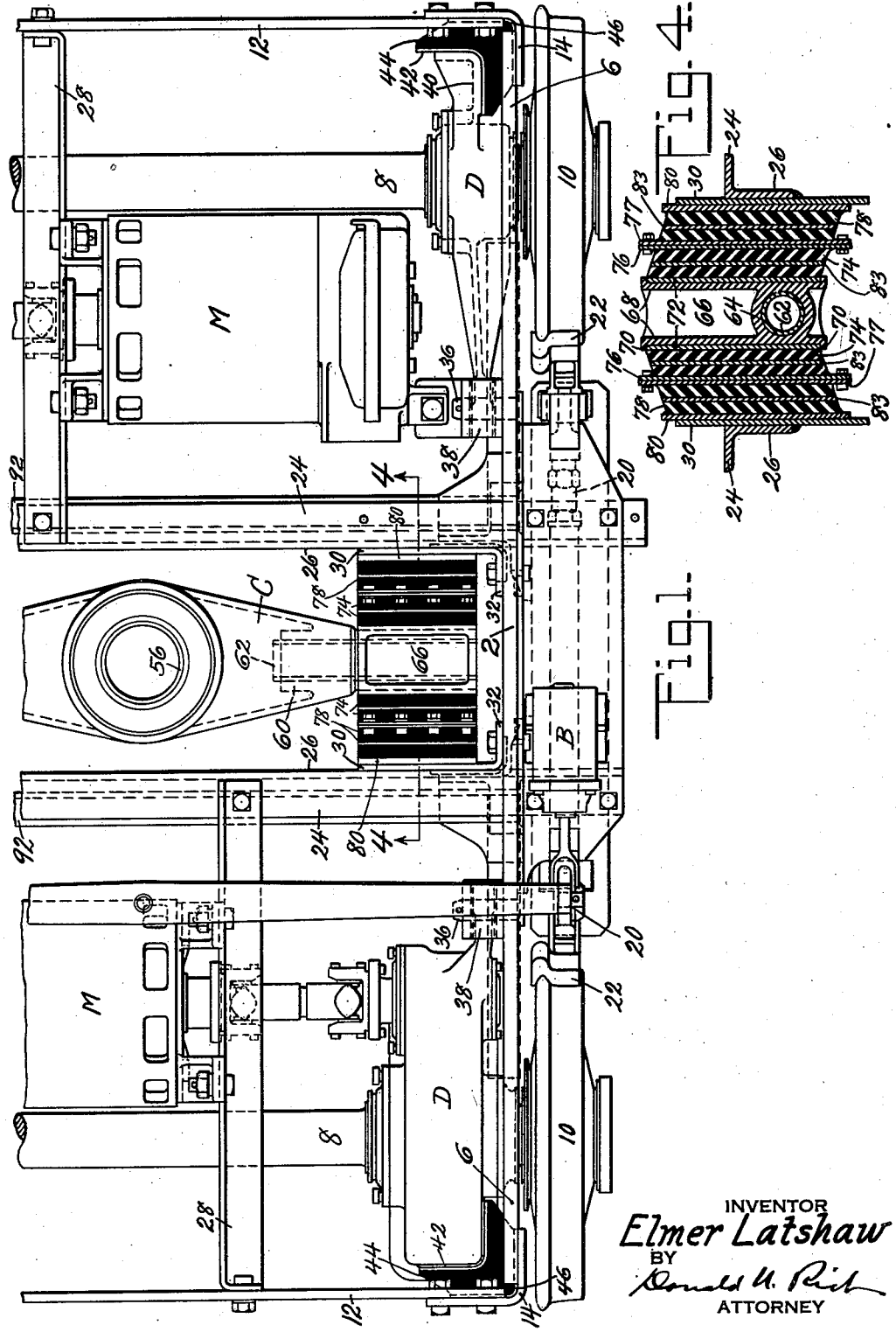
INVENTOR
Elmer Latshaw
BY
ATTORNEY

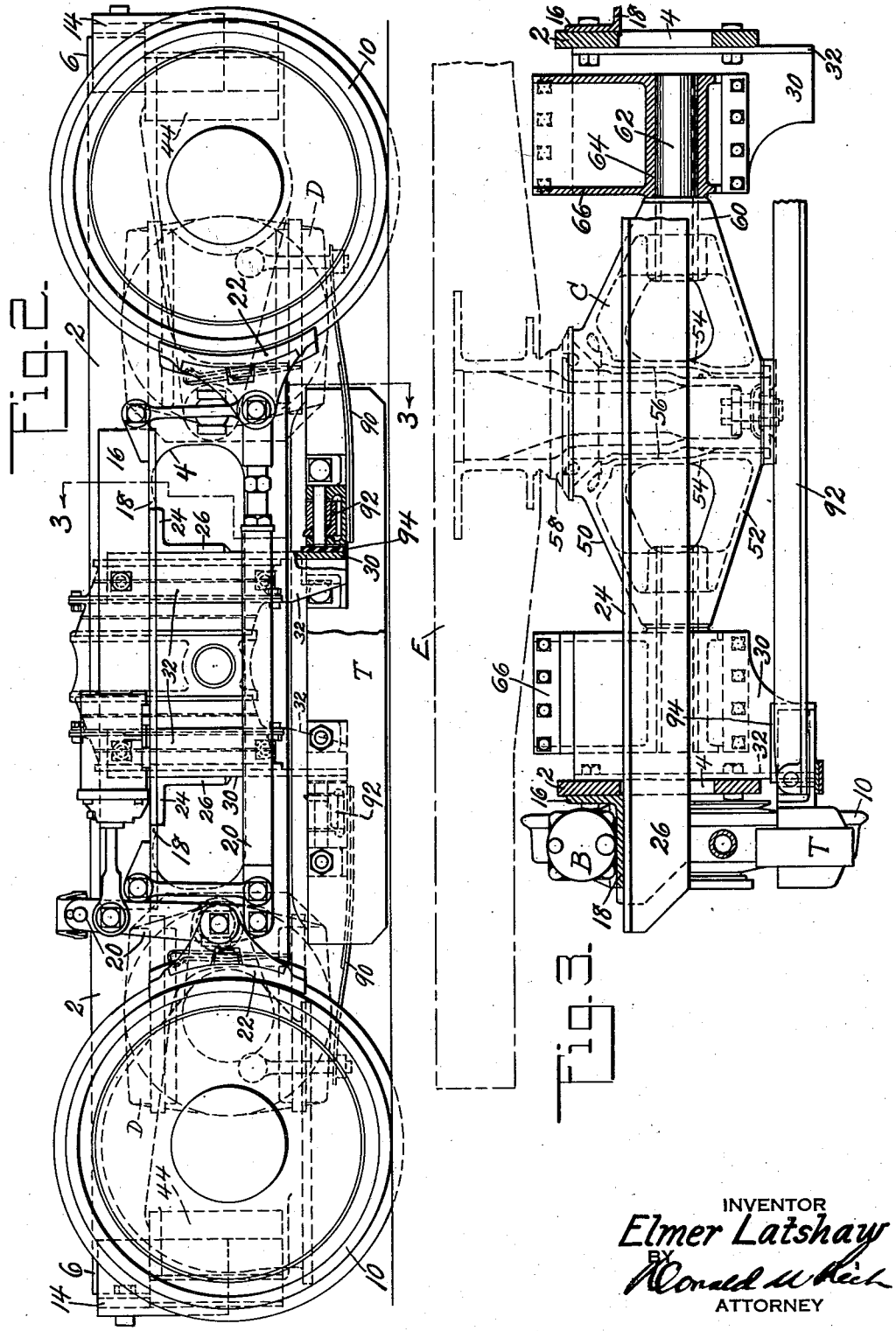

Patented Dec. 2, 1941

2,264,701

UNITED STATES PATENT OFFICE 2,264,701

TRUCK

Elmer Latshaw, Philadelphia, Pa., assignor to The J. G. Brill Company, Philadelphia, Pa., a corporation of Pennsylvania Application December 8, 1938, Serial No. 244,661

18 Claims. (Cl. 105—185)

This invention relates to trucks in general and in particular to light weight trucks intended for use on street or high speed railways.

In the past trucks have been constructed for various railway vehicles using coil springs alone, elliptic springs alone or a combination of the two, together with extremely heavy cast side frames and connecting members. In all of these trucks as previously constructed the side sway of the vehicle has been taken care of by means of side bearings supported in suitable manner, either by the bolster or the truck side frames. It is an object, therefore, of the present invention to provide a light weight truck in which side bearings are eliminated and the side sway absorbed by rubber units acting in shear.

Another object of the invention is the provision of a light weight truck having a floating bolster held against rocking relative to the car body by a long center pin but in which the bolster is connected to the truck by trunnions relieving the center pin connection of excessive strain.

A further object of the invention is the provision of a light weight truck provided with a floating bolster having its vertical and lateral movements controlled solely by rubber acting in shear.

These and other objects of the invention will be apparent to persons skilled in the art from a study of the following description and accompanying drawings, in which—

Figure 1 is a plan view of substantially one-half the improved truck;

Fig. 2 is an elevational view of the truck with a portion thereof broken away to more clearly disclose the track brake suspension;

Fig. 3 is a sectional view taken substantially on line 3—3 of Fig. 2, but with parts broken away to better disclose the bolster support and Fig. 4 is a sectional view taken substantially on line 4—4 of Figure 1 and showing in detail the connection between the bolster and transoms.

Referring now to the drawings in detail, it will be seen that the truck side frame 2 is of extremely simple construction, being formed by flame cutting from plate metal. The side frame consists of a central portion having an opening 4 cut therein and from which central portion arms 6 extend outwardly a sufficient distance to overlap and extend beyond the axles 8 which are supported by wheels 10 preferably of the resilient or sound deadening type. The ends of the side frames are joined together by cross bars 12 through the medium of corner angles 14, which corner angles extend downwardly a considerable distance below the side frame arms and end connections. Unequal angles are provided each having the short leg 16 thereof attached to the outer surface of the side frame adjacent the upper edge of the opening therein and having the long leg 18 extending outwardly from the frame, thus providing an admirable support for the brake cylinder B. The brake cylinders will act through the more or less conventional linkage 20 to cause the brake shoes 22 to contact the wheels. In order to tie the truck frames together adjacent the center of the truck, central connecting angles are provided having upper outwardly directed flanges 24, adapted to be bolted or otherwise secured to the under surface of leg 18, of the frame reenforcing angles, while the other legs 26 are directed downwardly, thus providing a space for reception of the truck bolster C later to be referred to. The truck end connections and center connecting angles are joined by angles 28 which not only tie the connections together but also provide support for motors or other auxiliary equipment M. In order to additionally tie the center connecting angles to the truck side frames, angle members 30 are provided having a long leg welded or otherwise secured to the flange 26 of the center connecting angles, while the short leg 32 thereof is bolted or otherwise secured to the truck side frame. These angle means are extended downwardly to a point below the lower edge of the side frame, as clearly shown in Figs. 2 and 3, in order that they may serve as guides for a track brake later to be described.

The skeleton truck frame is supported upon the wheels and axles by means of axle control arms D. Each of these axle control arms has an inner portion pivotally connected to the side frames by means of a pin 36 extending through the side frame and through a bracket 38 welded or otherwise secured to the side frame. The central portion of the axle control arms is supported upon the axles by any suitable means, such as anti-friction bearings (not shown), while the end remote from the pin 36 is formed with an angular projection 40 adapted to have secured thereto an angular plate 42. This angular plate has one face of an annular rubber block 44 vulcanized thereto, the other face being vulcanized to a second angular steel plate 46 adapted to be secured to the extensions of the corner connection angles 14 previously referred to. It will thus be seen that with such a connection the rubber blocks 44 will act in shear to resist the movements of the control arms, thus resiliently supporting the skeleton truck upon the wheels and axles.

The truck bolster, previously referred to, is preferably formed as a casting having an upper or compression member 50 and a lower or tension member 52 joined together at their ends and diverging toward the center of the casting where they are joined by vertical webs 54. These vertical webs are shaped to provide a cylindrical opening 56 adapted to receive a long center pin 58 rigidly connected to the car body E, as clearly shown in Fig. 3. The upper and lower members of the bolster increase in width from their ends toward the center as is clearly shown in Fig. 1, thus strengthening the bolster and permitting an increased bearing area between the bolster and center pin, thus insuring that no motion other than pivotal may take place between the truck bolster and the car body. The ends of the truck bolster are strengthened and cored as at 60 to receive a trunnion pin 62 extending outwardly from the bolster and adapted to have bearing engagement within bearings 64 carried by a bolster support or trunnion block 66 (Figs. 1 and 4). The bolster support or trunnion block is formed with side pieces 68 having upper and lower projections 70 of sufficient extent as to overlap a plate 72, thus preventing any relative motion between the plate and trunnion block. The plate 72 has one face thereof vulcanized to the adjacent face of a shear sandwich 74, which sandwich has its opposite face vulcanized to a plate 76. The plate 76 is adapted to be attached to a similar plate 77 which is vulcanized to one side of a shear sandwich 78, the other face of which is vulcanized to a plate 80 adapted to be secured by any suitable means to the angle member 30 previously referred to and which is attached to the truck frame and central cross ties. In the instance shown each shear sandwich is made up of two rubber blocks separated by means of a metal plate 83 to which the blocks are vulcanized. It is, of course, obvious that this intermediate plate may be eliminated or that the trunnion block may be joined to the supporting angles by a single rubber block instead of the multiple blocks shown and described. In assembling the shear units connecting the trunnion block and truck carried members, it will be necessary for the rubber units to be placed under a sufficiently high pre-compression as to prevent any separation of the units and associated parts when the parts are subjected to braking and starting loads.

Since the wheels are preferably of resilient or sound deadening type, it will be necessary to provide track brakes in order to attain a sufficiently high braking rate without any possibility of overheating the wheels. To this end a track brake T of the magnetic type is provided suspended by means of leaf springs 90 from the axle control arms. These track brakes are joined together for movement in unison by means of angle structures 92 extending across beneath the bolster and, as is clearly shown in Fig. 2, these connecting angles, or a part thereof, will bear against the extensions of angles 30 through the medium of a wear plate 94. Further description of the track brake and its support is unnecessary since such does not form any part of the present invention, but if further detail is desired, reference may be had to my co-pending application Serial No. 244,663 filed December 8, 1938, now Patent 2,207,295 granted July 9, 1940, which is directed to the track brake.

The operation of the improved truck is believed obvious, but in order to remove any possible question the following description of the truck's operation will be given: Assuming that the truck is subjected to a vertical shock or that the car body receives an additional load, then this shock or load will be absorbed by the rubber shear units on either side of the truck trunnion bolsters and by the control arm shear units and each of these units will be stressed in a substantially vertical straight line shear. If the truck is subjected to a lateral shock or the car body for any reason tends to move laterally of the truck, then the bolster shear units will be subjected to a substantially horizontal acting shear. Any rocking or swaying tendency of the body will be stabilized by the bolster shear units, since the truck bolster must move substantially in unison with the car body except under conditions tending to rotate the bolster about a vertical axis. Whenever the truck passes over inequalities in the track tending to lower one wheel and axle assembly, then the bolster trunnions 62 may rotate in the trunnion block without subjecting the rubber to any abnormal strain. Under straight braking or starting there is, of course, a tendency for the truck to move in a horizontal plane relative to the bolster, thus subjecting the bolster shear sandwiches to compressive loads, but, as previously pointed out, these sandwiches are placed under a sufficient pre-compression as to prevent separation of the sandwiches from the adjacent truck parts under any load to which they may be subjected. It will be obvious that except for the braking and starting loads all bolster movements, whether vertical, lateral or in controlling the sway, will be resisted by the units or sandwiches acting in shear.

While the improved truck has been described more or less in detail, it is obvious that various modifications and rearrangements of parts will be possible, but all such modifications and rearrangements of parts are contemplated as will fall within the scope of the following claims which define the invention.

What is claimed is:

1. In combination in a truck having wheel and axle assemblies in spaced relationship, side frames supported upon the wheel and axle assemblies, a bolster trunnion block located adjacent each side frame, means fastening said bolster trunnion blocks and the adjacent side frame together, said means comprising rubber shear units, a bolster, and a trunnion at each end of said bolster engaging said trunnion blocks whereby said bolster may rock longitudinally of the truck.

2. In a railway car truck, side frames, bolster trunnion members, resilient units joining together said members and side frames for controlling the movements of said members, and a bolster having trunnions at its ends extending transversely of the truck, said trunnions being supported in said members for rocking movement of the bolster longitudinally of the truck.

3. In combination in a truck having wheel and axle assemblies in spaced relationship, side frames supported upon the wheel and axle assemblies, a bolster trunnion block located adjacent each side frame, means fastening said bolster trunnion blocks and the adjacent side frame together, said means comprising rubber shear units, a load supporting bolster, and a trunnion at each end of said bolster engaging in said trunnion blocks adjacent the lower portions thereof whereby said bolster may rock longitudinally of the truck.

4. In combination in a truck having wheel and axle assemblies in spaced relationship, side frames supported upon the wheel and axle assemblies, a bolster trunnion block located adjacent each side frame, means joining said bolster trunnion blocks and the adjacent side frame together, said means comprising rubber shear units, a bolster, and a horizontally extending trunnion projecting from each end of said bolster and into bearing engagement with said trunnion blocks.

5. In combination in a truck having wheel and axle assemblies in spaced relationship, side frames supported upon the wheel and axle assemblies, a bolster trunnion block located adjacent each side frame, means joining said bolster trunnion blocks and the adjacent side frame together, said means comprising rubber shear units, a load supporting bolster, and horizontally extending trunnions projecting laterally substantially from the ends of said bolster, said trunnions having bearing engagement with said trunnion blocks whereby said bolster may rock longitudinally of the truck.

6. In a railway car truck, side frames, bolster trunnion members, resilient units fastening said members and side frames together for controlling the movements of said members, and a load supporting bolster having trunnions at its ends extending transversely of the truck, said trunnions being supported by said members adjacent the lower edge thereof whereby the point of load application to the top of said bolster may be positioned below the top of said truck and said bolster may rock longitudinally of the truck.

7. In combination in a truck having wheel and axle assemblies in spaced relationship, side frames supported upon the wheel and axle assemblies, a bolster trunnion block located adjacent each side frame, a truck bolster, trunnions extending transversely of the truck and located substantially at the ends of said bolster and having bearing engagement in said trunnion blocks, and means securing said trunnion blocks and the adjacent side frame together, said means comprising elastic units so formed and arranged as to act in shear to control the lateral and vertical movements of the bolster.

8. In combination in a truck having wheel and axle assemblies in spaced relationship, side frames supported upon the wheel and axle assemblies, a bolster trunnion block located adjacent each side frame, a truck bolster, trunnions extending transversely of the truck substantially from the ends of said bolster, said trunnions having bearing engagement in said trunnion blocks whereby said bolster may rotate relative to the trunnion blocks, and means joining said trunnion blocks and the adjacent side frame together, said means consisting at least in part of elastic units so connected, formed and arranged as to act in shear to control the vertical and lateral movements of the bolster.

9. In a railway vehicle the combination of a body, a relatively long center pin rigidly connected to the body and extending downwardly a substantial distance below the body, a truck located beneath the body, said truck consisting in part of connected side frames supported on wheel and axle assemblies, a truck bolster having a center bearing portion engaging said body center pin for the major portion of its length, a trunnion located substantially at each end of said bolster, trunnion blocks rotatably supporting said trunnions, and elastic units fastening said trunnion blocks and the adjacent side frames together and acting in shear to support said bolster and body on the truck, said trunnions extending transversely of the truck whereby said truck may rotate relative to said bolster and body.

10. In a railway vehicle the combination of a body, a truck located beneath the body, said truck consisting in part of rigidly connected side frames supported on wheel and axle assemblies, a load supporting truck bolster, trunnion means with which the ends of said bolster are engaged, means connecting said truck bolster and body and permitting rotation only of said bolster relative to the body about a substantially vertical axis, said bolster being supported by the side frames by means so constructed and arranged as to permit rotation of said bolster relative to the truck frame about a substantially horizontal axis, said means consisting in part of elastic units interposed between said trunnion means and adjacent truck parts and so connected and constructed as to act in shear to resist vertical and lateral movements of the bolster relative to the frame.

11. In a railway car truck, a frame comprising connected side and end members and spaced transoms, a bolster arranged between the transoms and having trunnioned end portions projecting longitudinally therefrom, and means supporting said bolster comprising resilient members interposed between and connected to the trunnioned end portions of the bolster and the adjacent transoms and so formed and arranged as to shearingly resist relative vertical and lateral movements between the bolster and frame.

12. In a railway car truck, a frame comprising connected side and end members and spaced transoms, a bolster arranged between the transoms and having trunnioned end portions projecting longitudinally therefrom, and means supporting said bolster comprising resilient members interposed between and connected to the trunnioned end portions of the bolster and the adjacent transoms, said members being preloaded in compression and being so arranged as to resist vertical and lateral relative movements between the frame and bolster in shear.

13. In a railway car truck, a frame comprising side members and end members, axle control arms pivotally connected to the side members, resilient means connecting said side and end members and control arms together in such a manner as to be subject to shearing action in service, spaced transoms extending between the side members, a bolster arranged between the transoms and provided with trunnioned end portions, and means supporting said bolster comprising resilient members interposed between and connected to the trunnioned end portions of the bolster and the adjacent transoms, said resilient members being so arranged as to resist vertical and lateral relative movements between the frame and bolster in shear.

14. In combination a truck having wheel and axle assemblies in spaced relationship, side frames supported upon the wheel and axle assemblies, a bolster trunnion block located adjacent each side frame, means fastened to said bolster trunnion blocks at either side thereof and to the adjacent side frame, said means consisting, at least in part, of rubber shear units, a load supporting bolster, and trunnions on the ends of said bolster engaging said trunnion blocks whereby said bolster may rock longitudinally of the truck and resiliently support the load imposed upon the bolster.

15. In a railway car truck, bolster trunnion members, resilient units extending between and connected to said trunnion members and to the adjacent truck parts for controlling the movements of said trunnion members, and a load supporting bolster having trunnions at its ends extending transversely of the truck and into engagement with the lower portion of said trunnion members whereby said bolster is rockably supported by said trunnion members below the horizontal center thereof.

16. In a railway car truck, bolster trunnion members, resilient units joined to said trunnion members and to the adjacent truck parts for controlling the movements of said trunnion members, and a load supporting bolster having trunnions at its ends extending transversely of the truck and into engagement with said trunnion members, said bolster trunnions engaging the trunnion members adjacent the lower edge thereof whereby the bolster is rockably suspended by the trunnion members with the load supporting top of the bolster below the top edge of said truck.

17. In combination in a truck having wheel and axle assemblies in spaced relationship, side frames supported upon the wheel and axle assemblies, a bolster trunnion block located adjacent each side frame, a load supporting truck bolster, trunnions extending transversely of the truck substantially from the ends of said bolster, said trunnions having bearing engagements in said trunnion blocks whereby said bolster may rotate relative to the trunnion blocks, and elastic means fastened to said trunnion blocks and to the adjacent side frame, said elastic means being so formed and arranged as to act in shear to control the vertical and lateral movements of the bolster.

18. In a railway car truck, a truck frame comprising connected side and end members and spaced transoms, a bolster arranged in the space between the transoms and having trunnion end portions, trunnion blocks supporting the ends of said bolster, and resilient members connected to said trunnion blocks and spaced transoms, said resilient members being interposed between the sides of said trunnion blocks and transoms and acting in shear to resist vertical and lateral relative movements between the truck frame and bolster.

ELMER LATSHAW.